Dec. 5, 1961  E. L. MOYER ET AL  3,011,841
SEALED BEARING ASSEMBLY
Filed Oct. 10, 1956  3 Sheets-Sheet 1

INVENTORS
EDWARD L. MOYER
ALBERT H. OSBORNE
BY John A. Young
ATTORNEY

Dec. 5, 1961  E. L. MOYER ET AL  3,011,841
SEALED BEARING ASSEMBLY
Filed Oct. 10, 1956  3 Sheets-Sheet 2
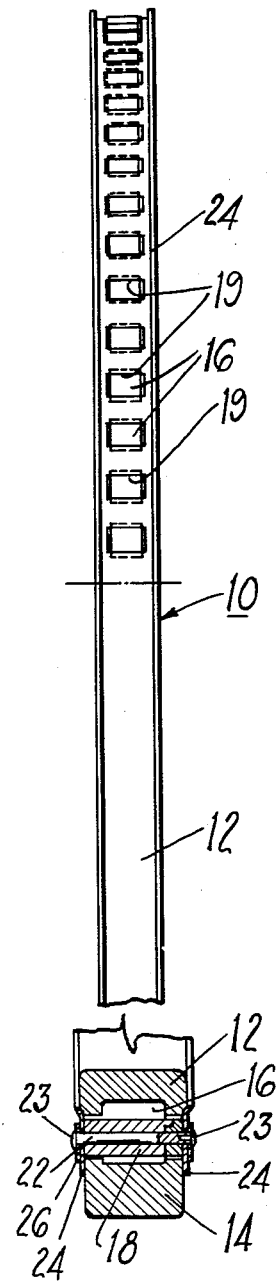
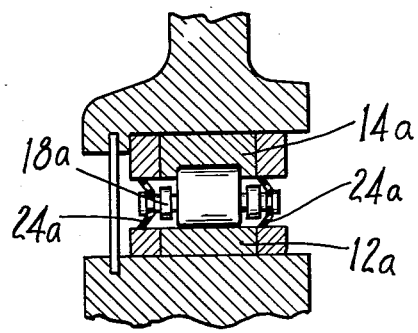
Fig. 5
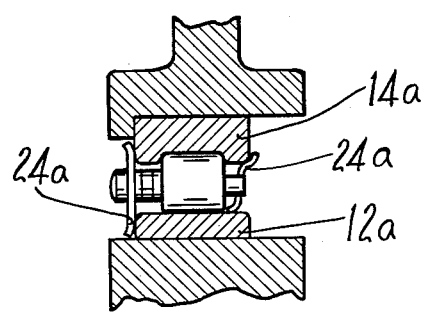
Fig. 6
INVENTORS
EDWARD L. MOYER
ALBERT H. OSBORNE
BY John A. Young
ATTORNEY

INVENTORS
EDWARD L. MOYER
ALBERT H. OSBORNE

United States Patent Office 3,011,841
Patented Dec. 5, 1961

3,011,841
SEALED BEARING ASSEMBLY
Edward L. Moyer and Albert H. Osborne, South Bend, Ind., assignors to The Bendix Corporation, a corporation of Delaware
Filed Oct. 10, 1956, Ser. No. 615,148
2 Claims. (Cl. 308—187.1)

This invention relates to a sealed bearing assembly which is used in aircraft wheel and brake structures such as the one disclosed in Patent No. 2,616,525.

It has become common practice in the aircraft wheel and brake art to provide large diameter bearings to increase available space for the brake assembly. This bearing design has presented problems of properly sealing the interior thereof so that lubricating material is retained within the bearing and foreign matter is prevented from filtering into the bearing and thereby reducing its antifriction properties.

Various proposals have been offered for sealing the bearing against contamination and one method which has gained some recognition is known as the "labyrinth" type seal in which there are two interfitting parts having close tolerance clearances, one associated with the rotatable race of the bearing and the other associated with the non-rotatable race of the bearing. These interfitting parts serve as a baffle which prevents foreign material from entering the bearing. As described, there is a slight clearance between the parts which make up the "labyrinth" and as long as actual contact of the parts is prevented, the seal functions satisfactorily. Unfortunately, with the larger bearing constructions there are considerable lateral deflections of the wheel which reduce the clearances in the fitting of the parts and the relatively thin portions thus come into contact and quickly become worn or distorted to reduce the efficiency of the seal.

A second type sealing means, which is sometimes referred to in the art as a "contact" type seal has been proposed to overcome the deficiency of the "labyrinth" type seal. The contact seal has the inherent deficiency of becoming overheated and worn by the friction developed from contact between the seal and its engaging part. The wearing effect on the seal is proportional to abrasion of the seal and the frictional heat which is developed between the contacting surfaces. Both of these facts are in turn influenced by the relative speed between the seal and its engaging surface. With the larger bearing constructions, the relative speed between the contact type seal and its engaging surface, becomes quite large and thus the problem of wear rate of the contact seals becomes appreciable.

It is an object of the present invention to provide a contact type seal arrangement in which there is a reduction in the relative speed between the contact seal and its engaging surface; thus, wearing effect upon the seal is drastically reduced since the temperatures are lowered and abrasion of the seal is diminished.

It is a further object of the invention to make a contact type seal feasible with a large bearing construction where such seals were previously impractical or unsatisfactory.

It is a further feature of the invention to provide a circularly movable contact type seal which is incorporated into the bearing assembly in such a manner that wearing effect upon the seal is reduced to about one-half that previously obtainable with similar bearing constructions.

Other objects and features of the invention will become apparent from a consideration of the following description which proceeds with reference to the accompanying drawings, wherein a plurality of embodiments of the invention are described by way of example:

FIGURE 1 is a front elevation view of the novel bearing assembly;

FIGURE 2 is a section view taken on the line 2—2 of FIGURE 1, the bottom half of FIGURE 2 showing the inner surface of the inner race and the upper portion of FIGURE 2 having the outer race removed.

FIGURE 3 is an enlarged section view taken on line 3—3 of FIGURE 1;

FIGURES 5 and 6 are further embodiments of the invention showing how the sealing arrangement might be further modified.

Figure 4:
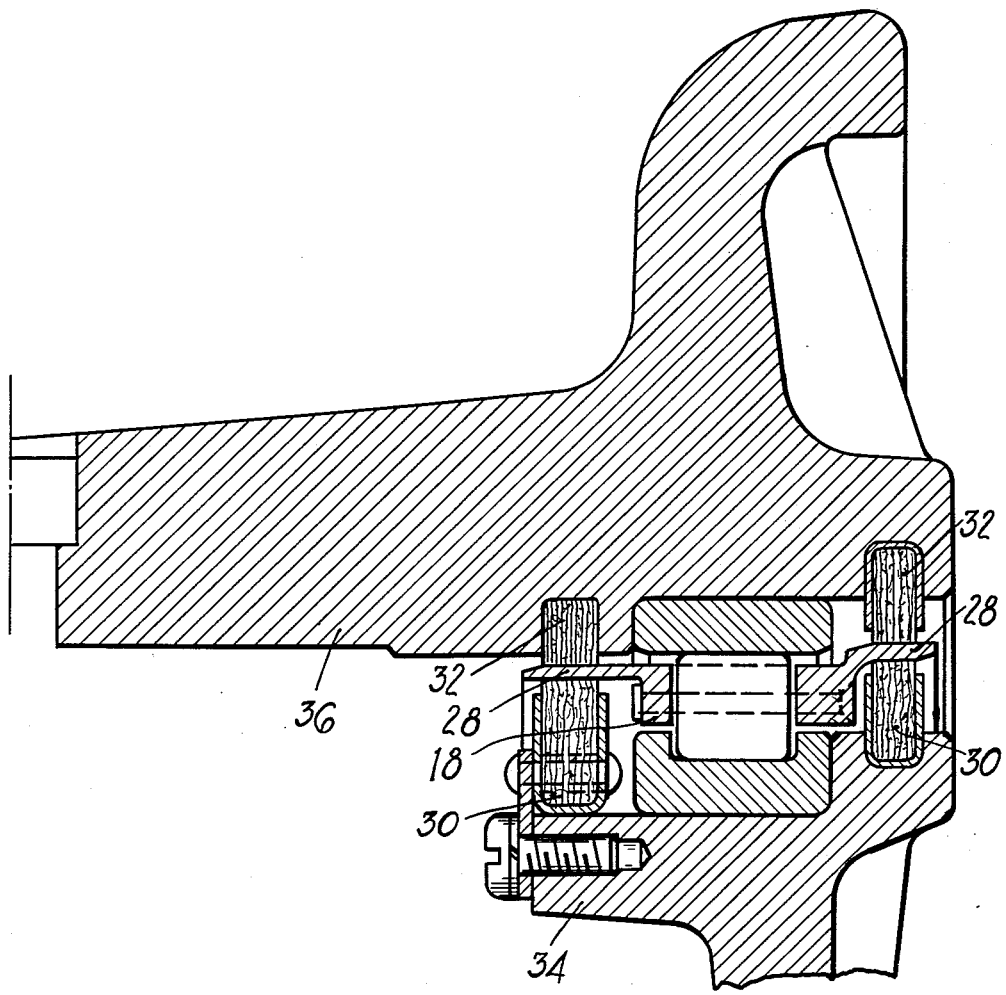
FIGURE 4 is an enlarged fragmentary section view of a wheel and bearing assembly illustrating a second embodiment of the invention.

The bearing assembly shown in FIGURES 1 through 3 is designated generally by reference numeral 10. The bearing assembly comprises an inner circular race 12 which is held fixed, an outer circular race 14 (FIGURE 3) which is of larger diameter than the inner race 12 and is relatively rotatable, and a plurality of roller bearing elements 16 circumferentially spaced in the annular confines between the inner and outer races 12 and 14. The outer race 14 is removed in FIGURE 1. To hold the roller bearings 16 in their relative angularly spaced positions around the circumference of the bearing, there is provided a ring-shaped cage 18 (upper portion of FIGURE 2) in which the rollers 16 are individually mounted. The cage 18 has blanked out portions 19 of shorter width than the roller diameter. A portion of the roller extends through the blank to support the outer race. The cage is drilled to receive a number of pins 20 which pass through the width of the bearing cage. Alternate pins (compare bottom half of FIGURE 2 and FIGURE 3) are flush with the surface of the cage 18 and the remaining pins 22 (FIGURE 2) extend beyond the face of the cage and the ends 23 are riveted to secure sealing rings 24 to opposite sides of the cage 18. The sealing rings 24 are composed of a plastic material consisting of polytetrafluoroethylene, this material is sold under the trademark "Teflon." The sealing rings 24 extend at the inner diameter portion thereof into sealing engagement with the inner race 12 (FIGURES 2, 3) and the outer diameter portions of the sealing rings extend into sealing contact with the outer race 14.

The sealing rings 24 extend around the entire circumference of the bearing and thus the annular space between the inner and outer race is enclosed by the two rings which are held against opposite sides of the cage 18. To clamp the sealing rings 24 against opposite sides of the inner and outer races, there is provided a number of arcuate angularly-spaced strips of metal 26 (FIGURE 1) which overlie the sealing rings 24. The strips of metal 26 are pulled together by riveting the ends 23 of pins 22, and the sealing rings 24 are thus clamped in sealing engagement with the inner race 12 and outer race 14 and are held in rubbing contact therewith.

The durability of contact type seals, as previously mentioned, depends upon the friction existing between the relatively movable parts which are to be sealed, the temperature to which the sealing member is raised during usage and abrasion between the sealing surfaces. The friction between the seal and its mating surface is controlled by the composition of the material. We have found that the low coefficient of friction of the "Teflon" material makes it very suitable for this purpose and that it is very stable under heat. Heating of the sealing material is determined in large part by the relative speed between the parts which are to be sealed. We have found that overheating of the seal can be reduced to a minimum when the relative speed between the parts is reduced. In other words, fraying and other deteriorative effects on the seal can be reduced to the extent that the relative speed between the seal and mating surface can be reduced. Because the sealing rings 24 are circumferentially movable with the cage 18 relatively to the inner and outer race, we have found that the relative speed between the sealing rings 24 and its engageable surface, is approximately one-half the relative speed between the inner race 12 and the outer race 14. Obviously, this reduction in relative speed between the sealing ring and its rubbing surface greatly reduces the wearing effect on the sealing ring over that obtainable where the sealing ring is secured to either of the inner or outer race and extends across the radial dimension of the bearing into contact with the other race.

The two sealing rings 24, by enclosing the annular space between the inner and outer races, serve to effectively contain the lubricant and also serve as a barrier, preventing contaminants from reaching the rollers 16 which provide anti-friction movement for the outer race 14.

As indicated in FIGURE 4, laterally extending projections 28 may be formed on the cage 18 and circular sealing rings 30 and 32 can be carried on the inner fixed wheel support 34 and wheel rim 36. In this case, the friction rings 30 and 32 extend into sealing contact with extensions 28 and the relative speed between the sealing rings 30 and 32 and the rubbing surface of extension 28 is only one-half the relative speed between the fixed wheel support 34 and wheel rim 36. Thus, the advantages of the invention can be realized with the sealing rings positioned on the wheel parts and extending into rubbing contact with a projection of the cage as well as providing a sealing ring carried by the cage and extending into contact with the inner and outer races of the bearing.

The sealing rings 24a, as indicated in FIGURES 5 and 6, may be further modified so that they extend into sealing engagement with the outer diameter of the inner bearing race 12a and the inner diameter of the outer bearing race 14a.

Referring next to the operation of the bearing, the inner race is supported on a fixed part of a vehicle, and the outer race 14 supports the rim of the wheel to permit rotation thereof. The weight of the vehicle is transmitted through the bearing to the wheel which is engageable with the ground. The wheel construction and vehicle construction form no part of the present invention and are, therefore, neither disclosed nor claimed herein. For convenient reference, however, to a wheel and brake construction with which the invention may be used, reference may be made to the brake shown in Patent No. 2,616,525, titled "Wheel and Brake Assembly," issued November 4, 1952.

It will be apparent to those skilled in the art that the principles of the invention are general in nature and are not to be restricted by the specific examples herein disclosed. Numerous modifications and revisions are to be reasonably expected by those skilled in the art and it is intended that such revisions and changes which include the novel principles disclosed herein, shall be contained within the scope of the following claims.

We claim:

1. A bearing for use with a wheel having an outer rotating portion mounted on an inner fixed portion, said bearing comprising an inner race carried by said inner fixed portion of said wheel, an outer race carried by said outer rotating portion of said wheel, a plurality of circumferentially spaced rotary bearing elements positioned between said inner and outer races and in contact therewith, a rotatable cage interconnecting said rotary bearing elements to maintain the relative circumferential spacing of said rotary bearing elements, a flange formed on each side of said cage and extending outwardly therefrom, a first sealing member carried by said outer rotating portion adjacent each of said flanges, a second sealing member carried by said inner fixed portion adjacent each of said flanges, said first and second sealing members extending into sliding engagement with said flanges to thereby enclose the annular space between said inner and outer races which contains said rotary bearing elements and effectively seal the same from contaminants.

2. A bearing for use with a wheel having an outer rotating portion mounted on an inner fixed portion, said bearing comprising an inner race carried by said inner fixed portion of said wheel, an outer race carried by said outer rotating portion of said wheel, a plurality of circumferentially spaced anti-friction bearing elements positioned between said inner and outer races and in contact therewith, a rotatable cage interconnecting said bearing elements to maintain the relative circumferential spacing of said bearing elements, a flange member fixedly secured to the side of said cage and extending outwardly therefrom, a sealing member carried by said outer rotating portion adjacent said flange member, a sealing member carried by said inner fixed portion adjacent said flange member, said first and second named sealing members extending into sliding engagement with said flange to thereby enclose the annular space between said inner and outer races which contains said rotary bearing elements and effectively seal the same from contaminants.

References Cited in the file of this patent

UNITED STATES PATENTS

| | | |
|---|---|---|
| 2,393,967 | Brubaker | Feb. 5, 1946 |
| 2,557,476 | Schwitter | June 19, 1951 |

FOREIGN PATENTS

| | | |
|---|---|---|
| 45,460 | Sweden | Feb. 17, 1916 |
| 407,450 | Great Britain | Mar. 22, 1934 |